United States Patent [19]

Frost

[11] Patent Number: 5,135,133
[45] Date of Patent: Aug. 4, 1992

[54] TANK FITTING

[75] Inventor: James O. Frost, Swartz, La.

[73] Assignee: Abell Corporation, Monroe, La.

[21] Appl. No.: 684,199

[22] Filed: Apr. 12, 1991

[51] Int. Cl.5 .............................................. B65D 90/00
[52] U.S. Cl. .................................... 220/601; 220/1.5; 220/465
[58] Field of Search ................ 220/601, 465, 1.5, 4.13

[56] References Cited

U.S. PATENT DOCUMENTS

| 406,246 | 7/1889 | Wacker | 220/601 X |
|---|---|---|---|
| 3,623,629 | 11/1971 | Hendershot | 220/465 X |
| 4,930,648 | 6/1990 | Hundt | 220/1.5 X |
| 4,961,509 | 10/1990 | Currier | 220/465 X |

FOREIGN PATENT DOCUMENTS 13948 10/1955 Fed. Rep. of Germany ...... 220/601

*Primary Examiner*—Steven M. Pollard
*Attorney, Agent, or Firm*—Brady, O'Boyle & Gates

[57] ABSTRACT

A plastic tank fitting having a circular flange portion molded integrally with the exterior surface of the plastic tank side wall adjacent to the tank bottom wall, and concentric with a drain opening in the tank side wall. Approximately 240° of the upper portion of the flange is flush with the tank side wall, while approximately 120° of the lower portion of the flange extends downwardly from the tank side wall adjacent the tank bottom wall. A flange and associated pipe fitting are bolted to the molded circular flange portion.

3 Claims, 1 Drawing Sheet

TANK FITTING

BACKGROUND OF THE INVENTION

In U.S. Pat. No. 4,492,392 dated Jan. 8, 1985, and owned by the assignee of the present invention, there is disclosed a tank fitting comprising a three flanged polyolefin fitting wherein two of the flanges are integrally connected to a pipe adapted to extend through a tank wall, and a back-up flange is slidably mounted on the pipe within the tank and bolted to one of the integral flanges exterior of the tank, to thereby make a sealing connection with the tank wherein the back-up flange abuts the interior wall surface of the tank. A siphon drain is connected to the free end of the pipe within the tank, to thereby facilitate the draining of the tank.

SUMMARY OF THE INVENTION

While the fitting disclosed in the above-mentioned patent has been satisfactory for its intended purpose, after considerable research and experimentation, the plastic tank fitting of the present invention has been devised which comprises, essentially, a circular flange portion molded integrally with the plastic tank side wall adjacent to the tank bottom wall. Approximately 240° of the upper portion of the flange is flush L with the tank side wall, while approximately 120° of the lower portion of the flange extends downwardly from the tank side wall adjacent the tank bottom wall. Large headed bolts are inserted from the inside of the tank through apertures provided in the upper portion of the molded circular flange while other headed bolts are inserted through the lower flange portion for securing a flange and associated fitting to the outside wall of the tank. By this construction and arrangement, a back-up flange abutting the interior wall surface of the tank, and a siphon drain as disclosed in the aforementioned patent, are not required.

DESCRIPTION OF THE PREFERRED EMBODIMENTS

Figure 1:
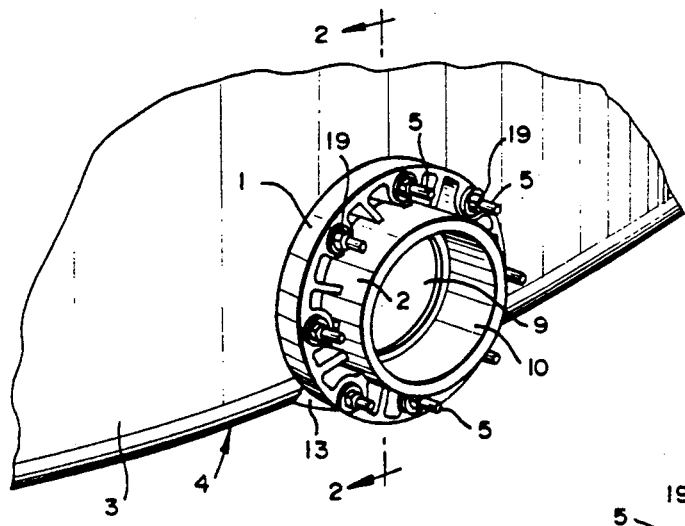
FIG. 1 is a fragmentary perspective view of the tank fitting of the present invention.
Figure 2:
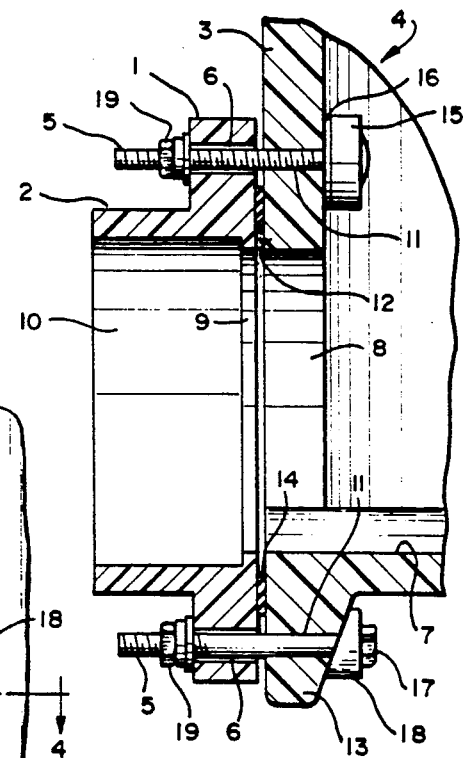
FIG. 2 is a view taken along line 2—2 of FIG. 1.

Referring to the drawing and more particularly to FIGS. 1 and 2, a flange 1 and integral pipe fitting 2 are shown secured to the exterior side wall surface 3 of a tank 4 by a plurality of bolts 5 extending outwardly from the tank through circumferentially spaced apertures 6 provided in the flange 1.

Figure 3:
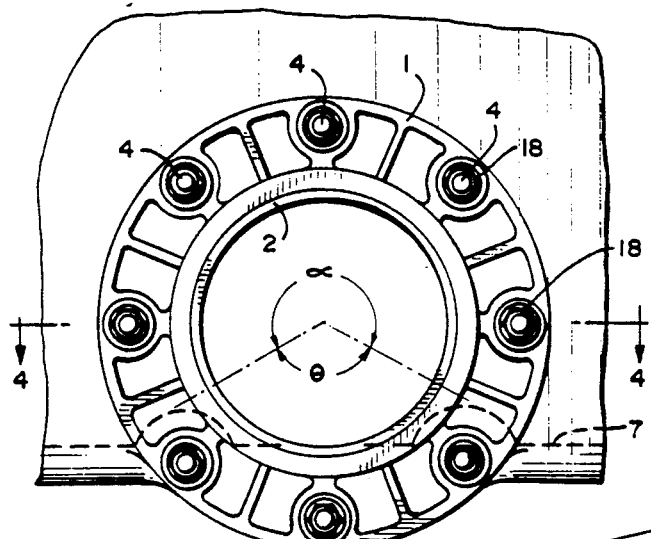
FIG. 3 is a fragmentary front elevational view of the fitting.
Figure 4:
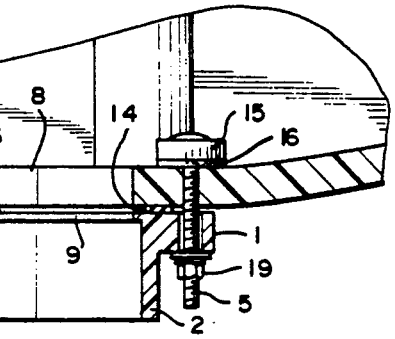
FIG. 4 is a view taken along line 4—4 of FIG. 3.

The tank side wall 3 adjacent the bottom wall 7 of the tank is provided with an opening 8 aligned with the openings 9 and 10 provided in the flange 1 and pipe fitting 2, respectively. The tank side wall 3 is provided with a plurality of circumferentially spaced apertures 11 in alignment with the apertures 6 in the flange 1 through which the bolts 5 extend, to thereby form a circular flange portion molded integrally with the tank side wall 3, whereby the upper portion 12 of the is flush with the tank side wall 3 and extends approximately 240° around the opening 8, as indicated by α in FIG. 3, while the lower portion 13 of the flange extends approximately 120° around the opening, as indicated by θ in FIG. 3. As will be seen in FIGS. 2 and 3, the lower flange portion 13 extends downwardly from the tank side wall 3 below the tank bottom wall 7.

To complete the structure of the tank fitting, a gasket 14 is interposed the face of flange 1 and the opposite face of the tank circular flange portions 12 and 13. The bolts 4 in the upper portion 12 of the circular flange are provided with enlarged heads 15 and gaskets 16 which engage the inner surface of the tank side wall 3, while the bolt heads 17 on the bolts 5, extending through the lower portion 13 of the circular flange, abut spacer washers 18 engaging the exterior surface of the flange portion 13. To tightly secure the flange 1 and associated pipe fitting 2 to the tank side wall 3, nut and washer assemblies 19 are threaded onto the free ends of the bolts 5.

From the above-description, it will be appreciated by those skilled in the art that the tank fitting is an improvement on tank fittings of the type disclosed in the aforementioned patent because the circular flange portion being molded integrally with the tank side wall precludes the necessity of a back-up flange abutting the interior wall surface of the tank, and by positioning the circular flange portion adjacent the bottom wall of the tank, the draining of the tank is facilitated without requiring the use of a siphon drain.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A plastic tank having side and bottom walls, a drain opening provided in said side wall adjacent said bottom wall, a circular flange having upper and lower portions portion molded integrally with the plastic tank side wall adjacent the bottom wall of said tank and concentric with the drain opening in the tank side wall, said upper portion comprising approximately 240° of the flange located within and flush with the tank side wall, said lower portion comprising approximately 100° of the flange portion extending downwardly from the tank side wall below the tank bottom wall, a plurality of circumferentially spaced apertures provided in said side wall and in said flange portion concentric with said drain opening, the apertures in the upper portion extending a circumferential distance of substantially 240° around the drain opening, the apertures in the lower portion extending a circumferential distance of substantially 120° around the drain opening, a flange and associated pipe fitting, said flange and pipe fitting having aligned openings in alignment with the drain opening, the pipe fitting flange having circumferentially spaced apertures aligned with the apertures in the tank side wall and flange portion, a bolt having an enlarged head extending through each of the aligned apertures in the upper portion of the circular flange and pipe fitting flange with the bolt heads engaging the interior surface of the tank side wall, a bolt extending through each of the aligned apertures in the lower portion of the circular flange and the pipe fitting flange exteriorly of the tank and nut assemblies secured to the free end of each bolt, whereby the necessity of including a back-up flange interiorly of the tank is precluded.

2. A plastic tank according to claim 1, wherein a gasket is interposed the opposing faces of the pipe fitting flange and circular flange.

3. A plastic tank according to claim 1, wherein gasket washers are interposed the enlarged heads of said bolts and the inner wall surface of the tank.

* * * * *